United States Patent
Spangler et al.

(12)

(10) Patent No.: US 6,470,829 B1
(45) Date of Patent: Oct. 29, 2002

(54) COLLAPSIBLE WINDOW ENCLOSURE FOR PETS

(76) Inventors: Robert D. Spangler, 1922 Poplars Rd., York, PA (US) 17404; Brian H. Jordan, 41 Front St., York Haven, PA (US) 17370

( * ) Notice: Subject to any disclaimer, the term of this patent is extended or adjusted under 35 U.S.C. 154(b) by 0 days.

(21) Appl. No.: 09/662,049

(22) Filed: Sep. 15, 2000

Related U.S. Application Data

(60) Provisional application No. 60/154,318, filed on Sep. 17, 1999.

(51) Int. Cl.[7] .................................................. A01K 1/03
(52) U.S. Cl. ...................... 119/484; 119/474; 119/485; 119/499
(58) Field of Search ................................ 119/474, 452, 119/453, 482, 496, 497, 498, 499, 572, 573, 514, 484, 485, 28.5

(56) References Cited

U.S. PATENT DOCUMENTS

| | | | | |
|---|---|---|---|---|
| 4,029,048 A | | 6/1977 | Gershbei | |
| 4,256,056 A | * | 3/1981 | Sou | 119/497 |
| 4,484,540 A | * | 11/1984 | Yamamoto | 119/497 |
| 4,763,606 A | * | 8/1988 | Ondrasik, II | 119/474 |
| 4,788,934 A | | 12/1988 | Fetter | |
| 4,803,951 A | * | 2/1989 | Davis | 119/497 |
| 4,811,968 A | * | 3/1989 | Bolden | 280/652 |
| 4,858,561 A | * | 8/1989 | Springer | 119/165 |
| 4,909,188 A | * | 3/1990 | Tominaga | 119/474 |
| 4,917,047 A | * | 4/1990 | Wazeter, III | 119/474 |
| 4,989,546 A | | 2/1991 | Cannaday | |
| 5,000,121 A | * | 3/1991 | Daily | 119/461 |
| D317,216 S | | 5/1991 | Cutron | |
| 5,054,426 A | * | 10/1991 | Panarelli et al. | 119/473 |
| 5,113,793 A | * | 5/1992 | Leader et al. | 119/453 |
| 5,148,767 A | | 9/1992 | Torchio | |
| 5,261,350 A | | 11/1993 | Vavrek | |
| 5,277,148 A | * | 1/1994 | Rossignol et al. | 119/453 |
| 5,337,697 A | | 8/1994 | Trimarchi et al. | |
| 5,353,738 A | * | 10/1994 | Chiu | 119/461 |
| 5,469,807 A | | 11/1995 | Kosmaczeska | |
| 5,522,344 A | | 6/1996 | Demurjian | |
| 5,803,019 A | * | 9/1998 | Heilborn et al. | 119/475 |
| 5,890,455 A | * | 4/1999 | Donchey | 119/484 |
| 6,082,305 A | * | 7/2000 | Burns et al. | 119/497 |

* cited by examiner

*Primary Examiner*—Yvonne R. Abbott

(57) ABSTRACT

A collapsible pet enclosure that is fashioned to fit in standard windows and has removable material coverings and screen panels on all sides. Domestic animals can use the enclosure to enjoy the out doors with out the owners fearing for their safety or health, as is the case in letting pets out of doors on the ground level. There are detachable wheels as part of the unit that convert the enclosure to a mobile pet carrier, that one may roll instead of carry.

6 Claims, 3 Drawing Sheets

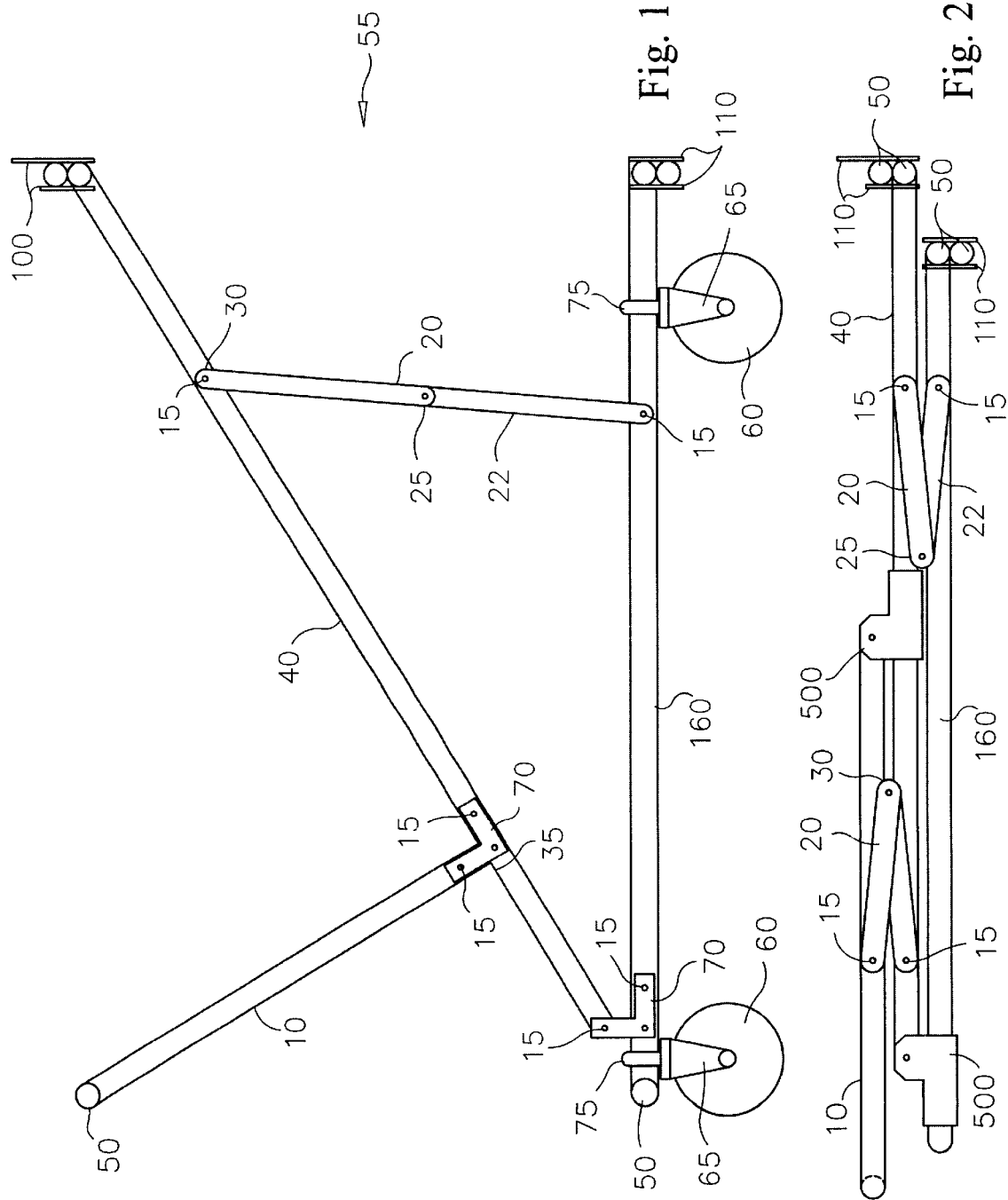

COLLAPSIBLE WINDOW ENCLOSURE FOR PETS

Priority is hereby claimed to Provisional Application No. 60/154,318 entitled Collapsible Window Enclosure for Pets filed on Sep. 17, 1999.

FIELD OF THE INVENTION

The present invention relates in general to attachable outdoor window boxes. And more specifically, to a lightweight enclosure, suitable for allowing small pets to enjoy the fresh air from a confined location and for transporting them generally.

BACKGROUND OF THE INVENTION

Pet lovers around the world are always striving to find or create more humanitarian ways to increase their pets' quality of life. In urban settings, in particular, tight spatial considerations often impede pet owners' abilities to provide appropriate outdoor access for their pets.

As a result, there have been a number of attempts to capitalize on the idea of a window attachment—exemplified most commonly by the air conditioner and the flower box, both of which generally project outward from the facade of the building. To date, the multiple variations of patented box-like devices designed to provide a confined outdoor access for pets have been contemplated as window units and were not designed nor contemplated for dual use as a pet transporter.

U.S. Pat. No. 4,788,934, issued to Fetter on Dec. 6, 1988, was designed specifically for mounting in a carport or garage with a door opening into the home and attached to an "accordion" tunnel or flex-screen pet door allowing the pet to enter and exit without human interference or participation and without obstructing the door to which it is connected or impeding human access. Fetter's invention is unlike the present invention in that it is not intended for use in windows, is not intended for transport of animals, and is not collapsable.

U.S. Pat. No. 4,989, 546, issued to Cannaday on Feb. 5, 1991, is a screened box-like design with metal top, bottom and frame, designed to fit into a window in like manner to an air-conditioning unit, with a hinged pet door that can be pushed open at will by the pet. Cannaday's invention is unlike the present invention in that the structure is permanently affixed to the window, non- collapsible, and not intended for animal transport.

U.S. Pat. No. 317,216, issued to Cutrone on May 28, 1991, is limited to ornamental designs for a screened window-box demarcating the entrance to a pet enclosure which can be installed in like manner to an air-conditioning unit. Cutrone's design is unlike the present invention in that it is not collapsible, is not intended for pet transport, and is intended to be a permanent fixture in the window.

U.S. Pat. No. 5,148,767, issued to Torchio on Sep. 22, 1992, is a pet enclosure for window installation consisting of replaceable glass or screened side panels or plates, which includes a heating device installed on a panel which slides in beneath a perforated floor plate; not intended for pet transport.

U.S. Pat. No. 5,261,350, issued to Vavrek on Nov. 16, 1993, is a permanently installed pet enclosure for window, wall or door installation, and consists of a reinforced structure, ventilation vents, a security sleeve secured from the interior, floor and side screens and a roof structure most conducive to diverting rain away from the interiors; not intended for pet transport.

U.S. Pat. No. 5,337,697, issued to Trimarchi et al. on Aug. 16, 1994, is a pet enclosure for window installation that looks like a mini-barn, having a wood or metal frame, screening on the sides, vents for air circulation, pet door, and exterior braces for support of the base; not intended for pet transport.

U.S. Pat. No. 5,469,807, issued to Kosmaczeska on Nov. 28, 1995, is basically an open mesh bin container for permanent window installation, which is expandable in size and allows the window to be completely closed when the cage is not in use and not intended for pet transport.

U.S. Pat. No. 5,522,344, issued to Demurjian on Jun. 4, 1996, is a pet cage, for window assembly, which can be disassembled and consolidated into a compact unit for transport and easy storage, but is not structure out of light or collapsible materials and did not contemplate pet transporting.

All of the above patents were constructed with metal framing and some prohibitive combination of wood, chicken wire, screens or glass paneling (removable or permanent). Additionally, all of the aforementioned pet enclosures were designed for the singular use as an outdoor box.

However, except for the "Gershbein box," (registered under U.S. Pat. No. 4,029,048, issued to Gershbein on Jun. 14, 1977, which presents a combination animal cage and indoor-outdoor toilet (but was not intended as a pet carrier and is comprised of very heavy and cumbersome construction, uniquely different from that of the current invention), no patent has presented an adequate resolution to the versatile combination of removability, collapsibility and portability to the extent that the current invention incorporates such functions; therefore there remains a need for a light weight window enclosure for pets equally suitable for use as a pet carrier or window-installed pet dwelling, that can be removed and stored with minimal encumbrance.

SUMMARY OF THE INVENTION

The present invention allows small pets to enjoy the outdoors from a safe and covered location. This gives the owner the knowledge that their pet is able to go outdoors and the peace of mind that their pet won't get lost, does not need supervision, can come inside whenever it chooses and is safe from the hazards of the ground level while not being deprived of the benefits of "fresh air."

The current invention is designed to be placed in a window in a manner which allows the pet to enter from the inside of a house through a flap which can be left free or affixed in the closed position with velcro.

BRIEF DESCRIPTION OF THE DRAWINGS

FIG. 1 shows the side skeletal view of the frame and hinging mechanisms of the present invention, with wheel attachment details.

FIG. 2 shows the side view of the collapsed skeletal frame and hinging mechanisms of the present invention.

DETAILED DESCRIPTION OF THE PREFERRED EMBODIMENTS

Figure 3:
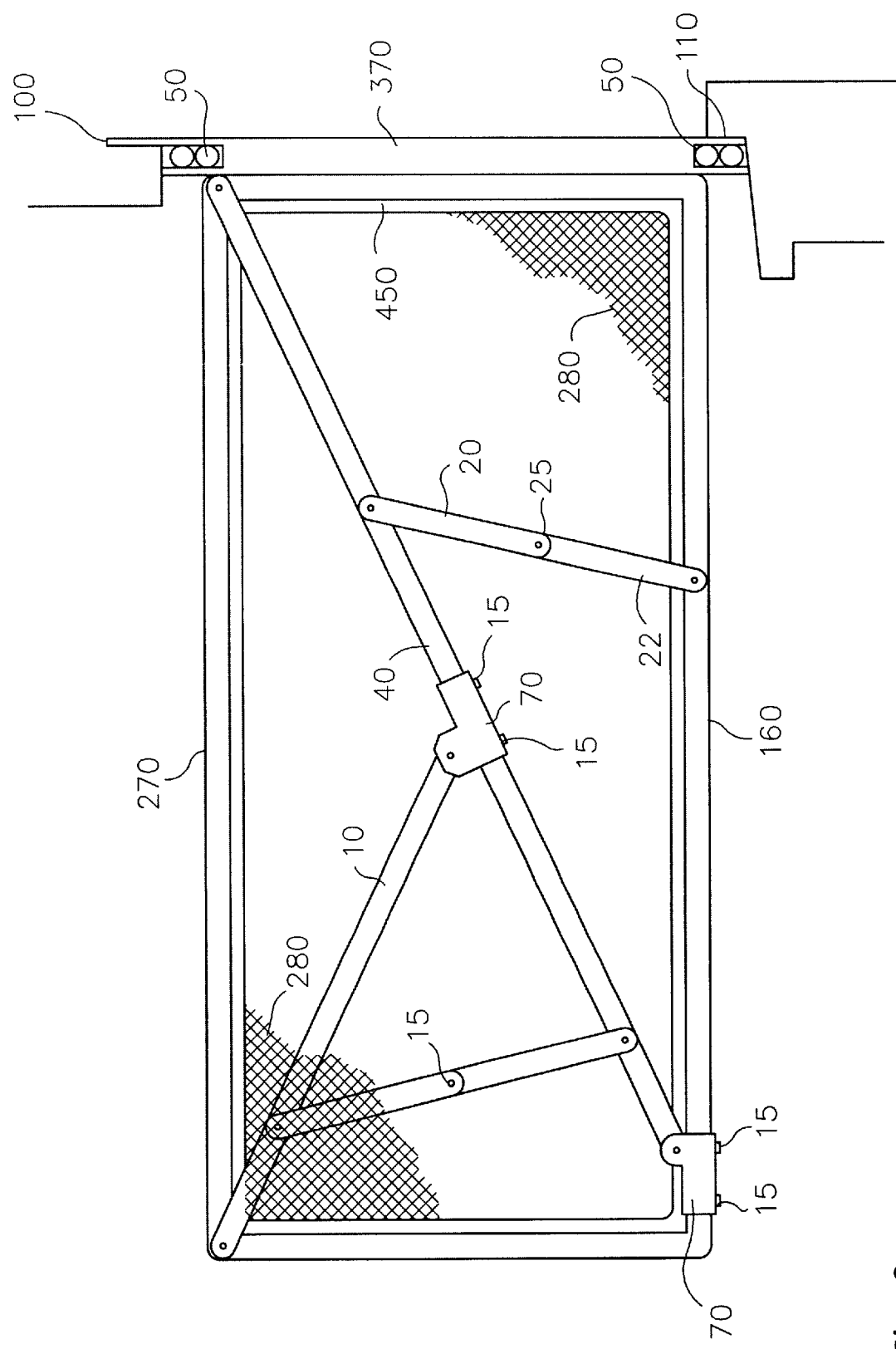
FIG. 3 shows the exterior side view of the present invention.

In FIG. 1, the embodiment of the present invention is constructed of hollow metal or fiberglass tubing (50), or other material similarly suited, attached to L-shaped hinged units (70) on the sides; thus making the present invention collapsible, portable, and light-weight. Also shown in FIG. 1 are a set of detachable wheels (60) to assist in travel. The detachable wheels (60) are mobile by means of a traditional wheel casing (65) and are adhered to a base (160) by a pole attachment (75). The wheels (60) are positioned to hold the base (160) at least 2 inches off the ground so that the cats, or other pets, are not injured by rocks or stray debris on the path. The base of the frame (160) is attached to tent like material (see FIG. 3 or 4), which the present invention folds onto when collapsed (see FIG. 2).

The tubing (50) is exhibited in various forms in FIG. 1. In the preferred embodiment, the top end of upper bar (10) is connected at 900 to longest tubing member (40) forming the top bar to the exterior end of the present invention. The bottom end of upper bar (10) is attached in a pivot position at a L shaped bracket (70) which is in turn fastened to longest tubing member (40) via three rivets (15). Longest tubing member (40) forms the diagonal support at either side of the frame. Approximately 6" from the exterior end, upper hinge point (30) is formed with longest tubing member (40) and upper hinge member (20). The top end of longest tubing member (40) is also joined at 90° to the top tubing member (50) of the entrance of the frame (55) which is set inside the window opening and attached to the window sash and sill via upper window support bracket (100) and lower window support bracket (110). Longest tubing member (40) forms the diagonal support at either side of the present invention. Longest tubing member (40) is attached at approximately a 60 degree angle to the base (160) of the present invention creating the height and width of the present invention. The entrance (55) is covered with the tent-like material and screen as is displayed in FIG. 4.

The present invention has locking hinge mechanisms displayed as two identical members an upper hinge member (20) and a lower hinge member (22). The locking hinge members (20, 22) are attached to one another by a conventional rivet attachment (15) at middle hinge point (25). Upper hinge member (20) is attached to longest tubing member (40) at upper hinge point (30), as discussed previously. Upon collapsing of the present invention (see FIG. 2) middle hinge point (25) bends toward the intersection of longest tubing member (40) and upper bar (10) instead of toward entrance (55). Upper hinge point (30) allows longest tubing member (40) to collapse in a flat manner (See FIG. 2) on top of base (160) creating a compact embodiment of the present invention that is easily stored. Conventional rivet attachments (15) are used to connect each tubing member (50,40,10,160) to one another and to attach L-shaped hinged units (70) to each tubing member (50,40,10,160). Unit numbers (10), (40) and (160) are possible embodiments of three lengths of tubing (50) employed on the two sides of the frame in the current invention.

FIG. 2 shows the present invention in collapsed position for storage in colder months, or as needed. FIG. 2 shows a second embodiment of the brackets. Instead of L shaped brackets (FIG. 1, 70) the embodiment in FIG. 2 exhibits P shaped brackets (500). These P shaped brackets (500) are utilized in the same manner as the L shaped brackets (70), and are a second example of brackets that could be integrated as part of the present invention.

Figure 4:
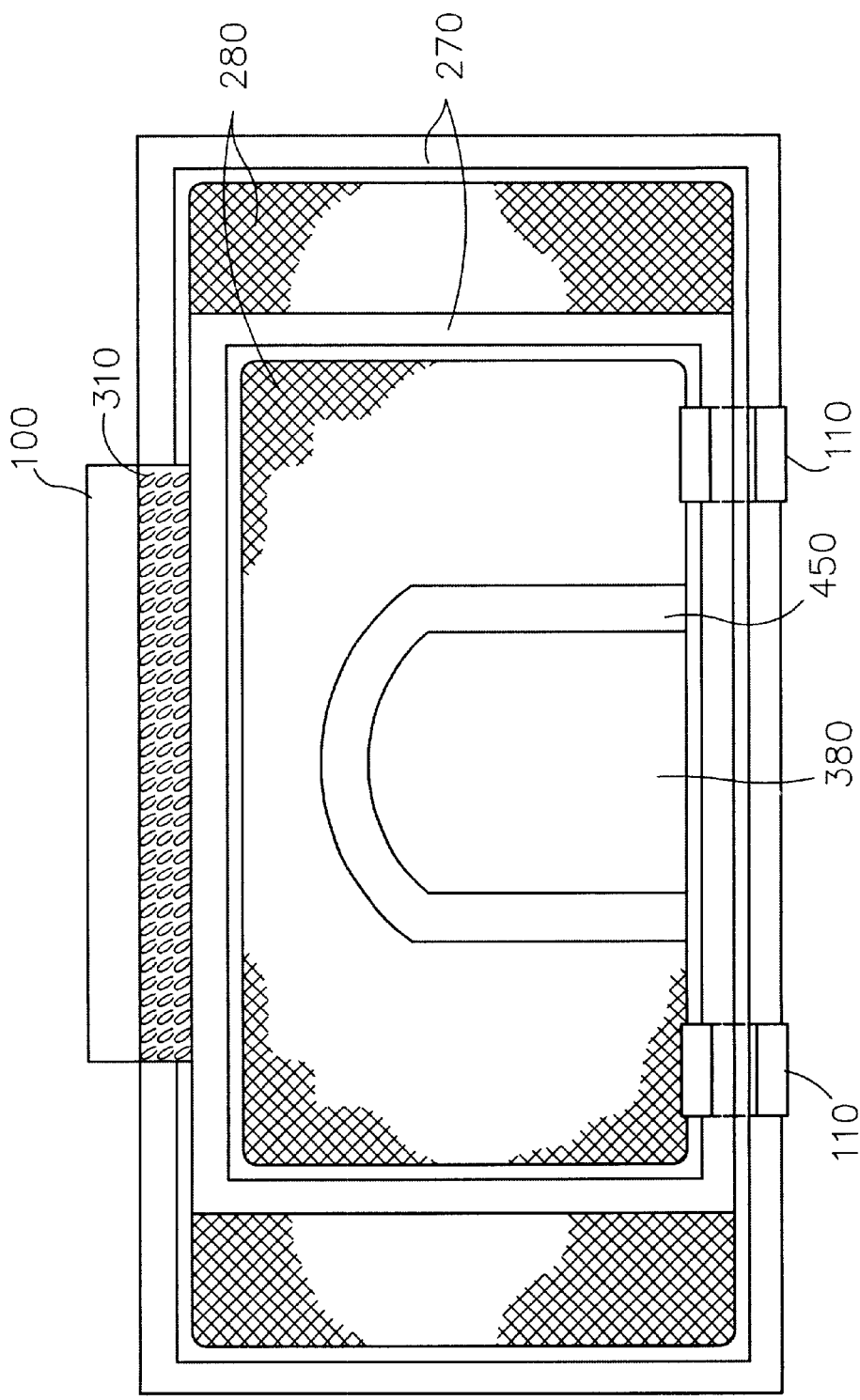
FIG. 4 shows the front view of the adjustable window screen and the center panel with the pet door of the present invention.

FIG. 3, an exterior side view of pet enclosure, displays the upper window support bracket (100), and lower window support bracket (110) which support tubing (50) that in turn form the top of adjustable window screen panel (280). FIGS. 3 and 4 display an embodiment of a "tent-type" of material (270), sewn onto a "nylon-type" screening material (280) allowing for ventilation, which also covers the collapsible frame tubing (50). In FIG. 4, an interior end view of enclosure, the screen (280) and frame are constructed in like manner to the sides of the pet enclosure. The entrance (380) on the interior end is made out of a flap of the "tent-like" material (270) and opens when pressure is applied in order to limit the transfer of heat or cold between outdoors. The entrance (380) is located in the enclosure's center screen frame (450). Two sliding screens (280), which can be adjusted to fit various window widths, slide in behind the enclosure center screen frame (450). In addition, strips (310)—which can be of a hook-and-loop-type fastener or any other suitable fastener, attach the various screen panels to the frame and also connect the enclosure to a window support bracket (100), which is affixed to the enclosure frame tubing (50) with rivets (15).

Both of the adjustable screens (280) and the interior end frame would be supported by the window support brackets (100,110) which are attached to the entrance panel with rivets (15) and together fit into the opening created between the window sash and sill. The window support brackets (100,110) have extra length on the interior side so that they can press up against the window sash and sill, preventing the enclosure from tipping out of the opening. Though not limited to the following embodiments, (280) indicates the "nylon-like" screening; (270) indicates the entrance flap made of "tent-like" material; (310) indicates the velcro strips which would attach the removable entrance panel to the enclosure frame. This removable entrance panel can be used in colder times to deter cool air to enter a climate controlled home.

The present invention is a pet enclosure that serves as a rolling pet. It is to be understood that the present invention is not limited to the sole embodiment described above, but encompasses any and all embodiments within the scope of the following claims.

What is claimed is:

1. A pet enclosure, comprising:

a series of tubing;

hinged units for attaching the pet enclosure in a window, in communication with said series of tubing;

tent-like material in communication with said series of tubing;

a window screen panel in communication with said tent-like material; and wheels, in communication with said tubing.

2. The enclosure of claim 1, wherein said hinged units allow said tubing to collapse onto said tubing at a base.

3. The enclosure of claim 1, further comprising a collapsible frame and removable, replaceable rectangular side and top panels.

4. The enclosure of claim 1, wherein said tubing is constructed out of fiberglass tubing.

5. The enclosure of claim 1, wherein said tubing is constructed out of metal tubing.

6. The enclosure of claim 1, wherein said pet enclosure can act as a pet carrier.

* * * * *